(12) United States Patent
Huber et al.

(10) Patent No.: US 6,313,228 B1
(45) Date of Patent: Nov. 6, 2001

(54) PEROXIDIC TREATMENT OF OLEFIN POLYMERS

(75) Inventors: Karl Huber, Frankenthal; Jürgen Schwind, Bornheim; Klaus Lehr, Volxheim; Hermann Elser, Wachenheim; Horst Klassen; Karl-Heinz Kagerbauer, both of Erftstadt, all of (DE)

(73) Assignee: Basell Polyolefine GmbH, Ludwigshafen (DE)

( * ) Notice: Subject to any disclaimer, the term of this patent is extended or adjusted under 35 U.S.C. 154(b) by 0 days.

(21) Appl. No.: 09/441,553

(22) Filed: Nov. 17, 1999

(30) Foreign Application Priority Data

Nov. 25, 1998 (DE) .............................. 198 54 285

(51) Int. Cl.$^7$ ...................................... C08F 8/30
(52) U.S. Cl. ................... 525/263; 525/308; 525/309; 525/320; 525/322; 525/329.2; 525/330.3; 525/333.8; 525/387
(58) Field of Search ................. 525/263, 308, 525/309, 320, 322, 329.2, 330.3, 333.8, 387

(56) References Cited

U.S. PATENT DOCUMENTS

| | | | |
|---|---|---|---|
| 4,006,283 | 2/1977 | Mackenzie, Jr. et al. | 526/57 |
| 4,015,058 * | 3/1977 | Schober | 525/387 |
| 5,344,886 | 9/1994 | Chang et al. | 525/285 |
| 5,344,888 | 9/1994 | Wild et al. | 525/301 |
| 5,416,169 * | 5/1995 | Saito et al. | 525/387 |
| 5,730,885 | 3/1998 | Blakeslee et al. | 210/773 |

FOREIGN PATENT DOCUMENTS

| | | |
|---|---|---|
| 1495275 | 3/1969 | (DE) . |
| 1808790 | 6/1970 | (DE) . |
| 2551206 | 7/1976 | (DE) . |
| 4220774 | 1/1994 | (DE) . |
| 4321529 | 1/1995 | (DE) . |
| 4435534 | 4/1996 | (DE) . |
| 0735054 | 2/1996 | (EP) . |
| 2295062 | 7/1976 | (FR) . |
| 95/16717 | 6/1995 | (WO) . |

OTHER PUBLICATIONS

Berg et al., "Organic Peroxides as Cross–Linking Agents", *Plastics Additives*, 4th Ed., 1993, p. 833–862.
Tzoganakis et al., *Chem. Eng. Prog.*, 1988, 84(11), "Controlled Degradation of Polypropylene", 47–49.

* cited by examiner

Primary Examiner—Bernard Lipman
(74) Attorney, Agent, or Firm—Keil & Weinkauf

(57) ABSTRACT

A process peroxidically treats olefin polymers with di-tert-butyl peroxide in an extruder. The olefin polymers together with di-tert-butyl peroxide under an inert gas are fed to an extruder. The olefin polymers are used in a finely divided form at from 55 to 110° C. The use of peroxidically treated olefin polymers for producing moldings, fibers, films or nonwoven spunbond fabrics is described, as is a process for producing moldings, fibers, films or nonwoven spunbond fabrics.

9 Claims, No Drawings

PEROXIDIC TREATMENT OF OLEFIN POLYMERS

The present invention relates to a process for peroxidic treatment of olefin polymers with di-tert-butyl peroxide in an extruder, in which the olefin polymers together with di-tert-butyl peroxide under an inert gas are fed to an extruder. The present invention further relates to the use of peroxidically treated olefin polymers for producing moldings, fibers, films or nonwoven spunbond fabrics, and also to a process for producing moldings, fibers, films or nonwoven spunbond fabrics.

Olefin polymers are used predominantly in the chemical form in which they are produced during the polymerization. However, for some application sectors it is necessary or advantageous to modify the olefin polymers chemically after the polymerization itself. Peroxides are frequently used here. Examples of reactions in which olefin polymers are treated with peroxides are grafting and crosslinking. Peroxides are also used for molecular-weight degradation.

To be suitable for peroxidic treatment of olefin polymers the peroxides have to satisfy a number of requirements. They must be safe to handle during transport, storage and processing. Their decomposition temperature and decomposition behavior must be such that they decompose only on reaching the desired part of the extruder, and there bring about the chemical modification of the polymer. Neither the peroxides nor their decomposition products may be toxic, and there must not be excessive loss of peroxide due to high volatility during the process.

Examples of peroxides which are used commercially in peroxidic treatment of olefin polymers are dicumyl peroxide, bis(tert-butylperoxyisopropyl)benzene, 2,5-dimethyl-2, 5-di-tert-butylperoxyhexane and di-tert-butyl peroxide (Gächter/Müller, Plastics Additives, 4th Edition, Hanser Publishers, Munich, 1993, Chapter 17 "Organic Peroxides as Cross-linking Agents", pages 833–962; C.Tzoganakis, J.Vlachopoulos and A. E. Hamielec, Chem. Eng. Prog. 1988, 84(11), "Controlled Degradation of Polypropylene", pp. 47–49). Di-tert-butyl peroxide has a particularly simple structure and from the commercial point of view is the most advantageous of these peroxides. However, it has high volatility and its use is therefore restricted and only possible in low concentrations, in the form of a master batch with a solid carrier. In addition, its ignition point is between 48 and 55° C., even under nitrogen, and safety aspects of its use are therefore regarded as problematic.

Other compounds of this type which are more expensive but easier to handle are therefore frequently used in industrial applications.

Although the use of di-tert-butyl peroxide is possible if the process is conducted appropriately, this is preferably carried out on laboratory or pilot-plant scale. Here, di-tert-butyl peroxide can be fed as a liquid via metering pumps to the extruder. WO 95/16717 and DE-A 42 20 774 give examples of processes in which di-tert-butyl peroxide is fed into an area of the extruder in which the polymer is molten. However, when the peroxide is added as a liquid to the extruder disadvantages are often encountered in relation to polymer properties and in particular in relation to the film properties of degraded propylene polymers. In addition, there is the danger of explosions within the extruder. Gaseous di-tert-butyl peroxide is quite capable of exploding even in an inert gas atmosphere. If a gas explosion of this type extends to involve liquid peroxide which may be present at the point of injection or also in the vicinity of this point, in particular if mixing into the polyolefin is not immediate, this can damage the extruder.

It is also possible to use di-tert-butyl peroxide as a mixture with the polymer or with a portion of the polymer. For example, U.S. Pat. No. 5,344,886 and U.S. Pat No. 5,344,888 describe processes in which, with the objective of grafting maleic anhydride, a propylene homopolymer in powder form is mixed with a solution of di-tert-butyl peroxide in toluene, a maleic anhydride solution and a coagent in such a way that the solution is absorbed by the polypropylene homopolymer. This mixture is fed to the extruder. However, the preparation of the mixture is a separate and lengthy step requiring provision of additional equipment. This is uneconomic and involves large quantities.

DT-A 25 51 206 describes a process for mixing liquid di-tert-butyl peroxide with a polyolefin, where the liquid di-tert-butyl peroxide is fed into the comminuted polyolefin material in a closed chamber at a significant depth below the surface of the polyolefin material. This, too, is a lengthy process and the di-tert-butyl peroxide is added at relatively low temperatures.

In principle, the peroxide may also be directly introduced into the feed hopper of the extruder together with the olefin polymer. However, for safety reasons it has generally been regarded as necessary here to operate well below 55° C. and to take engineering precautions so that any pressure arising from a possible explosion in the hopper can be released in a controlled manner. For older polymerization processes in particular, the low temperatures are no great disadvantage, since the steps for removing or deactivating the catalyst constituents mean that the polymer is produced at a temperature of this nature.

However, modern processes with high-performance catalysts do not require removal of the catalyst constituents, and the polymer is usually produced at from 70 to 90° C. It is normally also fed at these temperatures to the extruders in which it is pelletized and provided with additives. Equipment serving solely for prior cooling of the polymer in cases where di-tert-butyl peroxide is added to the feed hopper would significantly reduce the cost-effectiveness of the process.

It is an object of the present invention to overcome the disadvantages mentioned and develop a process which permits cost-effective peroxidic treatment of olefin polymers, produces products with good properties and in particular good film properties, and is capable of being carried out simply and safely.

We have found that this object is achieved in that there is no safety hazard using a particular grade of olefin polymers and feeding di-tert-butyl peroxide together with olefin polymers at from 55 to 110° C. directly into the feed hopper of an extruder.

The invention provides a process for peroxidic treatment of olefin polymers with di-tert-butyl peroxide in an extruder, in which the olefin polymers together with di-tert-butyl peroxide under an inert gas are fed to an extruder, which comprises using the olefin polymers in a finely divided form at from 55 to 110° C. The invention also provides the use of peroxidically treated olefin polymers for producing moldings, fibers, films or nonwoven spunbond fabrics, and also a process for producing moldings, fibers, films or nonwoven spunbond fabrics.

For the purposes of the present invention, peroxidic treatment is any reaction in which the olefin polymers are reacted with di-tert-butyl peroxide or with di-tert-butyl peroxide and other reactants. These include grafting or crosslinking reactions, and also degradation reactions.

If ethylenically unsaturated monomers capable of free-radical polymerization, such as maleic anhydride, acrylates or methacrylates, are added alongside di-tert-butyl peroxide to the olefin polymers, the result is graft copolymers in which individual ethylenically unsaturated monomers or polymer chains built up from the ethylenically unsaturated monomers have been grafted onto the olefin polymer chains. If ethylenically unsaturated monomers are added their proportion is usually from 0.1 to 30% by weight, based on the total amount of starting materials. The proportion of the ethylenically unsaturated monomers is preferably from 0.5 to 20% by weight and in particular from 1 to 15% by weight.

In the novel process the di-tert-butyl peroxide may moreover be used together with the olefin polymers with the objective of complete or partial crosslinking of the olefin polymers. Concomitant use of crosslinking auxiliaries, such as triallyl cyanurate or trimethylolpropane trimethacrylate, is also possible. For example, olefin polymers and di-tert-butyl peroxide are used in producing cable sheathings. Long-chain-branched polypropylene can be obtained if di-tert-butyl peroxide and, for example, trimethylolpropane trimethacrylate are added to propylene polymers.

In particular in the case of propylene polymers, peroxides are frequently added with the objective of reducing average molecular weight. This generally also results in a narrower molecular weight distribution and both the flow properties of the polymer melt, i.e. the processing properties, and the properties of the final products are affected. The result is generally advantages in the spinning process, but there can also be advantages in injection molding or extrusion blow molding. Peroxidically degraded propylene polymers are frequently termed controlled-rheology (CR) grades, and the expression "vis-breaking", is also used for the degradation procedure.

For the purposes of the present invention, olefin polymers are homo- or copolymers of olefins and in particular of $\alpha$-olefins, i.e. hydrocarbons with terminal double bonds. Examples of suitable monomers from which olefin polymers may be built up are functionalized olefinically unsaturated compounds, such as ester or amide derivatives of acrylic or methacrylic acid, e.g. acrylates, methacrylates or acrylonitrile. Preferred monomers are nonpolar olefinic compounds, including aryl-substituted $\alpha$-olefins, such as styrene. Particularly preferred $\alpha$-olefins are linear or branched $C_2$–$C_{12}$-1-alkenes, in particular linear $C_2$–$C_{10}$-1-alkenes, such as ethylene, propylene, 1-butene, 1-pentene, 1-hexene, 1-heptene, 1-octene, 1-nonene and 1-decene, and 4-methyl-1-pentene.

Preferred olefin polymers are homo- or copolymers of ethylene with a proportion of at least 50 mol % of ethylene, or homo- or copolymers of propylene with a proportion of at least 50 mol % of propylene. Among the copolymers of ethylene preference is given to those which comprise propylene, 1-butene, 1-hexene or 1-octene or mixtures of these as comonomer. The copolymers of propylene are in particular those which comprise ethylene or 1-butene or mixtures of these as comonomer. The propylene copolymers may comprise the other $\alpha$-olefins randomly incorporated, but they may also be in the form known as block or impact copolymers.

The preparation of the olefin polymers is known per se or can be carried out by methods known per se, either batchwise or preferably continuously, in conventional reactors used for polymerizing olefins. Suitable reactors are, inter alia, continuous stirred-tank reactors, agitated powder-bed reactors, loop reactors and fluidized-bed reactors, and if desired use may also be made of a sequence of identical or different reactors arranged in series. The polymerization reactions may be carried out in the gas phase, in suspension, in liquid and in supercritical monomers, or in inert solvents.

Use is made here in particular of conventional Ziegler-Natta catalyst systems which are usual in polymerization technology. These are generally composed of a titanium-containing solid component, the preparation of which frequently uses, in addition to titanium compounds, finely divided polymeric or inorganic supports, magnesium compounds, halogen compounds and electron-donor compounds, and of at least one cocatalyst. Possible cocatalysts are aluminum compounds. It is preferable to use one or more electron-donor compounds as further cocatalysts alongside an aluminum compound.

Catalyst systems based on metallocene compounds may also be used to prepare the propylene polymers. For the purposes of the present invention, metallocenes are complex compounds made from metals of transition groups of the Periodic Table with organic ligands, which together with metallocenium-ion-forming compounds give effective catalyst systems.

The central atoms present in the metallocenes usually used are titanium, hafnium or preferably zirconium, and the central atom generally has $\pi$-bonding to at least one, generally substituted, cyclopentadienyl group. The metallocene complexes in the catalyst systems are frequently present in supported form. In addition, the metallocene catalyst systems usually comprise, as metallocenium-ion-forming compounds, aluminoxane compounds or strong, neutral Lewis acids, ionic compounds with Lewis-acid cations or ionic compounds with Brönsted acids as cation.

The polymerization conditions are not critical. Pressures of from 1 to 3500 bar, preferably from 2 to 100 bar and in particular from 10 to 40 bar and temperatures of from 0 to 400° C., preferably from 20 to 250° C. and in particular from 50 to 100° C. have proven suitable.

The average molar masses of the polymers produced in the reactors may be controlled using the methods usual in polymerization technology, for example by adding regulators, such as hydrogen.

Di-tert-butyl peroxide is a peroxide marketed by a number of manufacturers and is particularly cost-effective to prepare because its structure is relatively simple. Di-tert-butyl peroxide is liquid at room temperature and is generally used undiluted or in dilute form as a constituent of a liquid mixture. The proportion of di-tert-butyl peroxide in the liquid used is usually from 10 to 100% by weight. The mixtures may be homogeneous mixtures with inert liquids, such as hexane, heptane or white oils. However, di-tert-butyl peroxide may also be used as an emulsion, for example in water. Preference is given to the use of undiluted di-tert-butyl peroxide.

The novel process preferably uses di-tert-butyl peroxide in compositions whose di-tert-butyl peroxide content is from 90 to 100% by weight, since this enables the reaction to be carried out with relatively little solvent which then has to be removed from the product.

Di-tert-butyl peroxide has a melting point of about −30° C. and relatively high volatility. Its vapor pressure at 20° C. is about 4.3 kPa. The gas space in contact with di-tert-butyl peroxide or a di-tert-butyl peroxide mixture therefore has a relatively high partial pressure of the peroxide. In mixtures with air the flashpoint is 6° C., i.e. at higher temperatures, ignition or a spark results in an explosion.

The explosion limit can be raised by excluding oxygen. However, even in an inert gas, such as nitrogen, argon or $CO_2$, a gas explosion can occur through spontaneous decomposition of di-tert-butyl peroxide. Sparks resulting from electrical discharges or caused by mechanical friction are sufficient here. The lower explosion limit for this is about 55° C. Any gas explosion occuring may furthermore extend to involve any liquid phase which is in contact. This means that safe operations with di-tert-butyl peroxide are generally possible only below 55° C. in an inert-gas atmosphere or below 6° C. in contact with air.

For the purposes of the present invention, extruders are any single- or two-stage machinery which accepts solid or liquid molding compositions and extrudes the same, predominantly continuously, through an orifice. In the extruder or mixer the molding compositions may be plastified, homogenized, mixed or chemically reacted, or gases may be incorporated or removed. Examples of extruders are Diskpack plasticators, pin-type extruders and planetary extruders. Other possibilities are combinations of mixers with discharge screws and/or gear pumps. Preferred extruders are screw extruders, and these may have single- or twin-screw design. Particular preference is given to twin-screw extruders and continuous mixers with discharge systems. Machinery of this type is conventional in the plastics industry and is manufactured by, for example, Werner & Pfleiderer, Berstorff, Leistritz, JSW, Farrel, Kobe or Toshiba.

In plastics processing the extruders are generally operated at from 100 to 400° C., in the case of olefin polymers preferably at from 120 to 350° C. and particularly preferably at from 200 to 300° C. The pressures prevailing in the extruders are from 0 to 200 bar, preferably from 0.5 to 150 bar.

It is usual for polymers to be melted, homogenized and provided with additives in an extruder after polymerization. For this, screw extruders, preferably twin-screw extruders, are generally used. The polymer is generally fed to an area of the screw which is relatively distant from the discharge orifice of the extruder. In the homogenizing section of the extruder the polymer is plastified or melted and is conveyed by the screw(s) into a second area in which there is a homogeneous phase of the polymer.

Additives or substances which are to be reacted with the polymer may be added together with the polymer via the feed hopper into the extruder. For this, some or all of the starting materials to be added at this location may firstly be mixed. Each of the starting materials may therefore be metered into the feed hopper separately or as part of a mixture. It is also possible for the additives or substances which are to be reacted with the polymer to be introduced in an area where the polymer is homogeneous, via suitable metering equipment, such as pumps, metering screws or ancillary extruders.

In the novel process, the olefin polymers are fed to the extruder together with the peroxide. This results in improved properties of the resultant products and in particular improved film properties, such as a lower fish-eye count. In addition, it is easier from the point of view of metering technology for conveying into the feed hopper to take place merely against ambient pressure, whereas the metering equipment used for conveying into the area of the homogeneous phase has to be designed for the pressures which can occur in the extruder. For safety reasons it is appropriate to add the polymer and the peroxide under inert gases, such as nitrogen, argon or $CO_2$.

From an economic point of view it is also of particular interest, and indeed specifically for polymers prepared and worked up in large quantities, for the extrusion step to follow the polymerization directly and for no intermediate storage or further conveying to be required. Even with modern polymerization processes using high-performance catalysts, the novel process permits these to be fed to the feed hopper of the extruder together with di-tert-butyl peroxide and without any further complicated cooling steps.

The temperatures of the olefin polymers used according to the invention are from 50 to 110° C. The temperatures of the polymers are preferably from 60 to 100° C. and in particular from 70 to 90° C. These temperatures, which are above ambient temperature, are generally the result of incomplete dissipation of the heat of polymerization.

The olefin polymers to be used according to the invention are in finely divided form. The polymer particles here preferably have an average particle diameter of from 100 to 5000 $\mu$m, particularly preferably from 200 to 4000 $\mu$m and in particular from 500 to 2000 $\mu$m.

The finely divided form of the olefin polymers may be obtained by grinding coarse particles, but it is preferable to use polymer particles which are produced in finely divided form in the polymerization process.

The specific surface area of the olefin polymers to be used according to the invention is preferably from 0.2 to 25 $m^2/g$, particularly preferably from 3 to 15 $m^2/g$ and in particular from 5 to 10 $m^2/g$.

The di-tert-butyl peroxide may be premixed with the olefin polymer or with some of the olefin polymer and fed to the feed hopper as a mixture. In a preferred embodiment the di-tert-butyl peroxide and the polymer are added separately. Preference is given here to introducing the di-tert-butyl peroxide into the hopper continuously as a liquid, undiluted or diluted, via a feed pipe. In particularly preferred embodiments the feed pipe is arranged in such a way that its end is constantly surrounded by descending finely divided polymer. Immersion of the feed pipe into the olefin polymer present in the feed hopper is also particularly preferred.

The amounts of di-tert-butyl peroxide fed to the extruder usually give a weight ratio of di-tert-butyl peroxide to olefin polymer of from 1:100000 to 1:500, preferably from 1:50000 to 1:1000 and in particular from 1:40000 to 1:1500.

When di-tert-butyl peroxide is added to a propylene polymer in the novel process with the objective of peroxidic degradation, the melt flow rate (MFR), measured to 1133 at 230° C. with a load of 2.16 kg, is generally increased by at least 5% over that of a propylene polymer extruded under identical conditions but without adding di-tert-butyl peroxide. Preference is given to an increase by a factor of from 1.2 to 30 and in particular from 2 to 10.

Usual amounts of additives may be added to the olefin polymers prior to, during or after the peroxidic treatment. These may be stabilizers, lubricants or mold-release agents, fillers, nucleating agents, antistats, plasticizers, dyes, pigments or flame retardants. Peroxidic treatment and addition of the additives preferably take place during an extrusion process.

The usual stabilizers are antioxidants, such as sterically hindered phenols, processing stabilizers, such as phosphites or phosphonites, acid scavengers, such as calcium stearate or zinc stearate or dihydrotalcite, sterically hindered amines, or also UV stabilizers. The polymers generally comprise amounts of up to 2% by weight of one or more of the stabilizers.

Examples of suitable lubricants and mold-release agents are fatty acids, the calcium or zinc salts of the fatty acids, fatty amides and low-molecular-weight polyolefin waxes, usually used in concentrations of up to 2% by weight.

Examples of fillers used for the polymers are talc, chalk and glass fibers in amounts of up to 50% by weight.

Examples of suitable nucleating agents are inorganic additives, such as talc, silica or kaolin, salts of mono- or polycarboxylic acids, such as sodium benzoate or aluminum tert-butylbenzoate, dibenzylidenesorbitol or its $C_1$–$C_8$-alkyl-substituted derivatives, such as methyl- or dimethyldibenzylidenesorbitol, and salts of diesters of phosphoric acid, such as sodium 2,2'-methylenebis(4,6-di-tert-butylphenyl)phosphate. The content of nucleating agents in the propylene polymers is generally up to 5% by weight.

Additives of this type are generally commercially available and are described, for example, in Gächter/Müller, Plastics Additives Handbook, 4th Edition, Hansa Publishers, Munich, 1993.

The novel process gives a cost-effective method for peroxidic treatment of olefin polymers. The resultant polymers have good properties and in particular good film properties, such as a low fish-eye count. They are suitable for producing moldings, films, fibers or nonwoven spunbond fabrics.

The process is particularly suitable when the peroxidically treated olefin polymers are subsequently processed to give films, fibers or nonwoven spunbond fabrics.

EXAMPLES

A series of model experiments was carried out to illustrate the effect of polymer morphology on the safety properties of di-tert-butyl peroxide and, respectively, mixtures of di-tert-butyl peroxide with olefin polymers.

In each case here use was made of a glass tube in the gas space of which there were two electrodes (ignition source) between which a discharge took place at intervals of 60 seconds.

Comparative Example A 50 ml of di-tert-butyl peroxide were charged to the glass tube under nitrogen.

The glass tube was slowly heated in prescribed temperature stages, while ensuring that the difference between the wall temperature and the temperature of the specimen was always less than 1° C. An explosion took place in the gas phase at a wall temperature of 48.0° C.

The experiment was repeated twice, and explosions took place at wall temperatures of, respectively, 47.9 and 48.5° C.

Example 1

170 g of a finely divided homopolypropylene powder were charged to the glass tube under nitrogen. The polypropylene powder, obtained by gas-phase polymerization, had an average particle diameter of 1000 μm and a specific surface area of 2.7 m$^2$/g. An amount of di-tert-butyl peroxide sufficient to give a weight ratio of di-tert-butyl peroxide to polypropylene powder of 1:1000 was then added, under nitrogen.

The glass tube was slowly heated in prescribed temperature stages, while ensuring that the difference between the wall temperature and the temperature of the specimen was always less than 1° C. This was continued to a wall temperature of 120° C. No explosion was observed.

Example 2

Example 1 was repeated, but the weight ratio of di-tert-butyl peroxide to polypropylene powder was 1:500 and 200 g of the powder were charged.

As in Example 1, the glass tube was slowly heated to a wall temperature of 120° C. No explosion was observed.

Comparative Example B

Example 1 was repeated, but pellets of the propylene polymer used in Examples 1 and 2 were used instead of the polypropylene powder. The pellets had an average diameter of 2 mm and a specific surface area of 0.0015 m$^2$/g.

The glass tube was slowly heated as in Example 1. An explosion occurred at a wall temperature of 71° C.

From Examples 1 and 2, and also Comparative Examples A and B, it is clear that mixtures of a finely divided olefin polymer and di-tert-butyl peroxide have significantly less tendency to explode, i.e. a higher temperature at which an explosion occurs, than di-tert-butyl peroxide alone or mixtures of coarse-particle olefin polymer and di-tert-butyl peroxide.

Comparative experiments of other types demonstrating the safety disadvantages of processes not according to the invention likewise always result in explosions. Because of the considerable damage likely to occur, experiments of this type were not carried out with an extruder, but were restricted to model-scale Comparative Examples A and B.

The examples below show that the novel process allows peroxidic treatment of olefin polymers to be carried out in an economically advantageous way directly following the polymerization.

Example 3

A propylene homopolymer with an MFR of 5.5 g/10 min (measured to ISO 1133 at 230° C. with a load of 2.16 kg) was polymerized continuously in an agitated powder-bed reactor of 25 m$^3$ capacity at 8000 kg/h output. The resultant pulverulent polymer had an average particle diameter of 1000 μm, a specific surface area of 5 m$^2$/g and a bulk density of 0.4 kg/l.

The propylene polymer emerging from the polymerization plant was mixed in a silo screw-mixer with the additives calcium stearate and pentaerythritol 3-tetrakis(2,5-di-tert-butyl-4-hydroxyphenyl)propionate. The amounts of the two additives resulted in a content in each case of 0.1% by weight in the final product.

The propylene homopolymer, which still had a temperature of 80° C., deriving from the polymerization, was continuously conveyed together with the additives into the feed hopper of a Werner & Pfleiderer ZSK 170 twin-screw extruder. The atmosphere in the feed hopper consisted of nitrogen. Di-tert-butyl peroxide was likewise fed continuously into the feed hopper at a rate of 0.3 kg per 1000 kg of propylene polymer, in such a way that the end of the feed pipe was always surrounded by free-falling propylene polymer powder.

The peroxidically treated propylene homopolymer was pelletized on leaving the extruder and had an MFR of 22 g/10 min. Propylene homopolymer was peroxidically degraded in this way for about 24 hours without any ignition occurring in the feed hopper.

From the pellets obtained, a single-screw extruder was used to produce a flat film of 40 μm thickness at a melt temperature of 190° C. with a throughput of 2.5 kg/h. During production of the film a Brabender CCD camera was used on-line for optical determination of the number of fish-eyes. The resultant fish-eye classification was 2.0. (The fish-eye classification is obtained via a calibration curve from the number of fish-eyes per m$^2$ and their size. A fish-eye classification of 1 here means that there are practically no fish-eyes, while 5 means that the polymer is not usable for films.)

Comparative Example C

Example 3 was repeated, but no di-tert-butyl peroxide was added to the feed hopper. However, peroxide was fed via a pump into the area of the extruder in which the polymer is molten. To avoid explosions in the extruder the peroxide used was 2,5-di-tert-butylperoxy-2,5-dimethylhexane.

The peroxidically degraded propylene polymer was likewise used to produce a flat film. The fish-eye classification was 3.5.

Comparative Example D

Example 3 was repeated, i.e. the peroxide was added to the feed hopper, but 2,5-di-tert-butylperoxy-2,5-dimethylhexane was used.

The peroxidically degraded propylene polymer was likewise used to produce a flat film. The fish-eye classification was 2.25.

Example 4

A propylene homopolymer with an MFR of 2.2 g/10 min (measured to ISO 1133 at 230° C. with a load of 2.16 kg) was polymerized continuously in an agitated powder-bed reactor of 25 m³ capacity at 6500 kg/h output. The resultant pulverulent polymer had an average particle diameter of 1200 μm, a specific surface area of 2.7 m²/g and a bulk density of 0.4 kg/l.

The propylene polymer emerging from the polymerization plant was mixed in a twin-fluid mixer with the additives calcium stearate and pentaerythritol 3-tetrakis(2,5-di-tert-butyl-4-hydroxyphenyl)propionate. The amounts of the two additives resulted in each case in a content of 0.1% by weight in the final product.

The propylene homopolymer, which still had a temperature of 70° C., deriving from the polymerization, was continuously conveyed together with the additives into the feed hopper of a Farrel (type UM 9) continuous mixer. The atmosphere in the feed hopper consisted of nitrogen. Di-tert-butyl peroxide was fed into the feed hopper as a 50% strength by weight mixture with white oil, again continuously, at a rate of 1.6 kg of mixture per 1000 kg of propylene polymer. The opening of the feed pipe was arranged directly above the rotors.

The peroxidically treated propylene homopolymer was pelletized on leaving the extruder and had an MFR of 18 g/10 min. Propylene homopolymer was peroxidically degraded for 8 hours in this way without any ignition occurring in the feed hopper.

Example 5

A propylene homopolymer with an MFR of 8 g/10 min (measured to ISO 1133 at 230° C. with a load of 2.16 kg) was polymerized continuously in an agitated powder-bed reactor of 12.5 m³ capacity at 2800 kg/h output. The resultant pulverulent polymer had an average particle diameter of 800 μm, a specific surface area of 7.2 m²/g and a bulk density of 0.37 kg/l.

The propylene polymer emerging from the polymerization plant was mixed in a conical screw mixer with the additives calcium stearate, pentaerythritol 3-tetrakis(2,5-di-tert-butyl-4-hydroxyphenyl)propionate and talc. The amounts of each of the two additives calcium stearate and pentaerythritol 3-tetrakis-(2,5-di-tert-butyl-4-hydroxyphenyl)propionate added resulted in a content of 0.1% by weight in each case in the final product. The talc content in the final product was set at 10% by weight.

The propylene homopolymer, which still had a temperature of 75° C., deriving from the polymerization, was continuously conveyed together with the additives into the feed hopper of a Werner & Pfleiderer ZSK 160 twin-screw extruder. The atmosphere in the feed hopper consisted of nitrogen. Di-tert-butyl peroxide was likewise fed continuously into the feed hopper at a rate of 0.42 kg per 1000 kg of propylene polymer, in such a way that its feed pipe was always immersed into the propylene polymer powder present in the feed hopper.

The peroxidically treated propylene homopolymer was pelletized on leaving the extruder and had an MFR of 54 g/10 min. Propylene homopolymer was peroxidically degraded in this way for 3 days without any ignition occurring in the feed hopper.

Example 6

A propylene homopolymer with an MFR of 1.2 g/10 min (measured to ISO 1133 at 230° C. with a load of 2.16 kg) was polymerized continuously in a loop reactor of 80 m³ capacity at 20000 kg/h output. The resultant pulverulent polymer had an average particle diameter of 1100 μm, a specific surface area of 5.3 m²/g and a bulk density of 0.5 kg/l.

The propylene polymer emerging from the polymerization plant was mixed in a conical screw mixer with identical proportions of each of the three additives calcium stearate, pentaerythritol 3-tetrakis(2,5-di-tert-butyl-4-hydroxyphenyl)propionate and talc. The amounts of the two additives resulted in a content in each case of 0.3% by weight in the final product.

The propylene homopolymer, which still had a temperature of 70° C., deriving from the polymerization, was continuously conveyed together with the additives into the feed hopper of a Werner & Pfleiderer ZSK 300 twin-screw extruder. The atmosphere in the feed hopper consisted of nitrogen. Di-tert-butyl peroxide was likewise fed continuously into the feed hopper at a rate of 0.57 kg per 1000 kg of propylene polymer, in such a way that its feed pipe was always immersed in the propylene polymer powder present in the feed hopper.

The peroxidically treated propylene homopolymer was pelletized on leaving the extruder and had an MFR of 54 g/10 min. Propylene homopolymer was peroxidically degraded in this way for 2 weeks without any ignition occurring in the feed hopper.

We claim:

1. A process for peroxidic treatment of olefin polymers with di-tert-butyl peroxide in an extruder, in which the olefin polymers together with di-tert-butyl peroxide under an inert gas are fed to an extruder, which comprises using the olefin polymers in a finely divided form at from 50 to 110° C.

2. A process as claimed in claim 1, wherein olefin polymers are used which have a specific surface area of from 0.2 to 25 m²/g.

3. A process as claimed in claim 1, wherein di-tert-butyl peroxide and olefin polymers are fed to the extruder in a weight ratio of from 1:100000 to 1:500.

4. A process as claimed in claim 1, wherein the peroxidic treatment of the olefin polymers is carried out directly after the polymerization.

5. A process as claimed in claim 1, wherein the di-tert-butyl peroxide is metered continuously into the extruder feed area.

6. A process as claimed in claim 1, wherein the olefin polymers used comprise propylene polymers.

7. A process as claimed in claim 6, wherein the melt flow rate (MFR) of the propylene polymers, measured to ISO 1133 at 230° C. under a load of 2.16 kg, is increased by at least 5%.

8. A process as claimed in claim 1, wherein the feed to the extruder also includes ethylenically unsaturated compounds, which are grafted at least to some extent, onto the olefin polymers.

9. A process for producing moldings, films, fibers or nonwoven spunbond fabrics, which comprises peroxidically treating olefin polymers as claimed in claim 1 and then processing them to give moldings, films, fibers or nonwoven spunbond fabrics.

* * * * *

UNITED STATES PATENT AND TRADEMARK OFFICE
CERTIFICATE OF CORRECTION

PATENT NO. : 6,313,228 B1
DATED : November 6, 2001
INVENTOR(S) : Huber et al.

It is certified that error appears in the above-identified patent and that said Letters Patent is hereby corrected as shown below:

<u>Column 10,</u>
Line 49, "50" should be -- 55 --.

Signed and Sealed this

Twenty-fifth Day of June, 2002

*Attest:*

*Attesting Officer*

JAMES E. ROGAN
*Director of the United States Patent and Trademark Office*